(12) United States Patent  (10) Patent No.: US 6,318,301 B1
Jackson et al.  (45) Date of Patent: Nov. 20, 2001

(54) DUAL HOOK LEAD ROPE AND METHOD OF USING SAME

(76) Inventors: Glenda L. Jackson; Bruce Jackson, both of 1726 Doty School Rd., Bates City, MO (US) 64011

( * ) Notice: Subject to any disclaimer, the term of this patent is extended or adjusted under 35 U.S.C. 154(b) by 0 days.

(21) Appl. No.: 09/447,967

(22) Filed: Nov. 23, 1999

(51) Int. Cl.[7] ............................ A01K 1/08; A01K 27/00; B68B 1/02
(52) U.S. Cl. ............................. 119/772; 119/792; 54/6.2
(58) Field of Search ........................... 119/769, 770, 119/772, 774, 783, 788, 791, 792, 795; 54/6.1, 6.2, 24

(56) References Cited

U.S. PATENT DOCUMENTS

| | | | | |
|---|---|---|---|---|
| 198,559 | * | 12/1877 | Bear | 119/788 |
| 1,746,403 | * | 2/1930 | Mulcahy | 54/6.2 |
| 4,879,972 | * | 11/1989 | Crowe et al. | 119/792 |
| 5,079,904 | * | 1/1992 | Berube | 54/6.2 |
| 5,505,162 | * | 4/1996 | Fleischer et al. | 119/792 |
| 5,517,949 | * | 5/1996 | Harris et al. | 119/795 |
| 6,053,128 | * | 4/2000 | McCulloch | 119/792 |

* cited by examiner

*Primary Examiner*—Charles T. Jordan
*Assistant Examiner*—Elizabeth Shaw

(57) ABSTRACT

A dual hook lead rope for leading and tying an animal, said lead rope comprising a rope having a first and second end, a first fastening device secured to said first end of said lead rope, a second fastening device secured to said lead rope at a point intermediate said first end and said second end, and a method of tying a horse using the described lead rope.

17 Claims, 1 Drawing Sheet

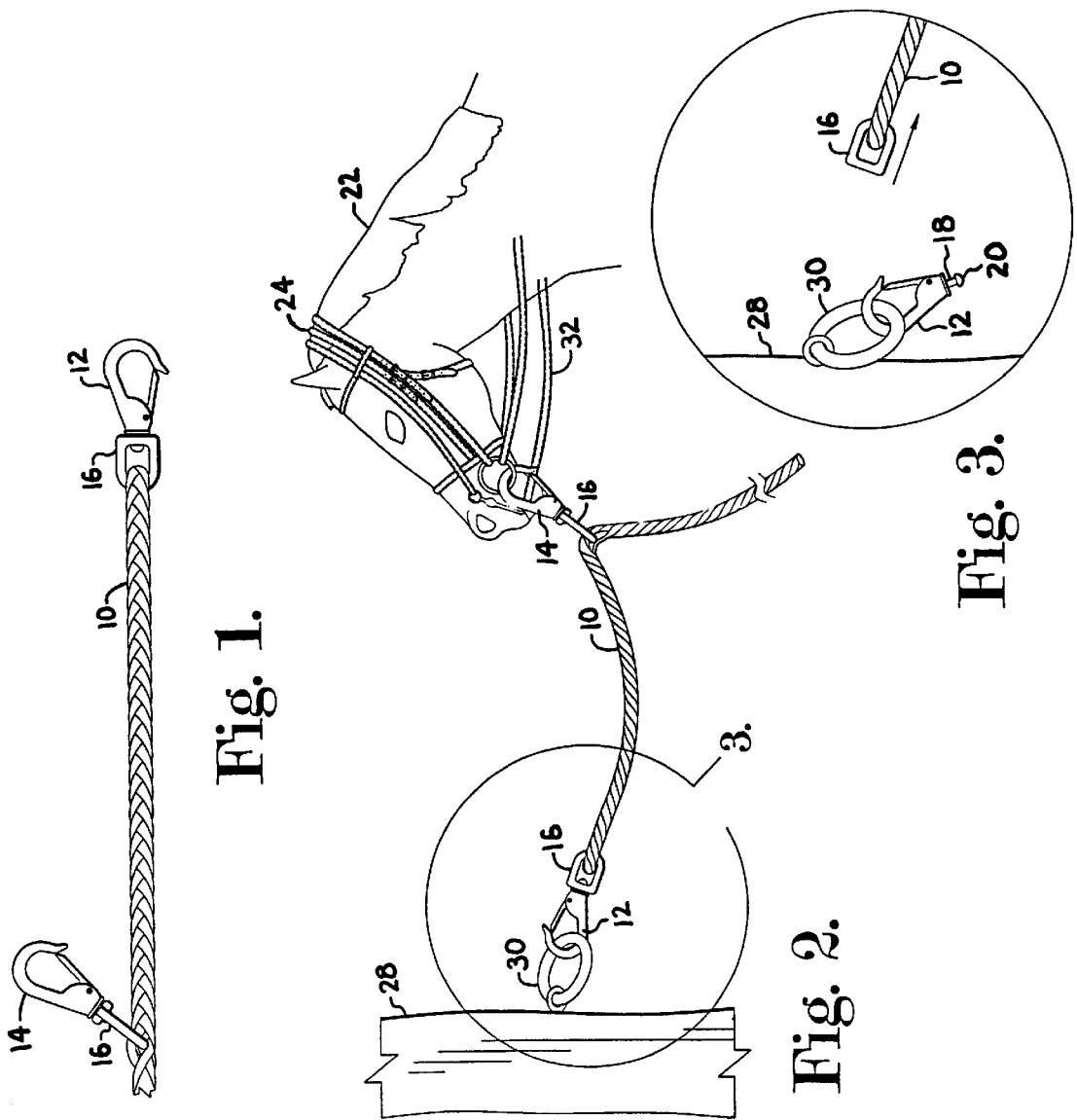

DUAL HOOK LEAD ROPE AND METHOD OF USING SAME

STATEMENT REGARDING FEDERAL SPONSORED RESEARCH OR DEVELOPMENT

Not applicable.

CROSS-REFERENCED RELATED APPLICATIONS

Not applicable.

BACKGROUND OF THE INVENTION

This invention relates to equipment used to lead animals and to secure animals to a fixed position. More particularly, this invention relates to a double hook lead rope and a method for using the invention with animals such as horses. Although the present invention is described below for use with horses, it is to be understood that the invention may be used with any haltered animal.

During the last decade, participation in horse related activities has increased, and the National Safety Council estimates that more than 10 million people in the United States are involved in equine sports. These numbers reflect the importance of safe horse handling at every level.

Horses survive in the wild because of their instinct to flee from danger. Therefore, horses may react to unfamiliar objects and circumstances by spooking, or fleeing, from the object of fear. Horses detect danger through their vision, sense of smell and sense of hearing. When the horse is resting or is not being ridden, it is important to be able to secure the horse in a fixed position. Tying is the general manner of keeping a horse in one place. Many horses learn to "tie" simply because they find it easier to stand quietly than fight. Tying is a basic element in training a horse.

Traditionally, halters are used to help catch, hold, lead and tie horses. Halters come in many styles and in many materials of varying quality. Halters and bridles are commonly referred to as headpieces. Often, halters have a lead line which hangs from the front end of the halter located proximate to the mouth of the horse. This lead rope end is used for tying the horse. There are three ways to tie a horse: tying with a single lead, ground tying and cross-tying.

When a horse is tied with a single lead, the handler ties the rope to a solid fixture, such as a post or a ring in a solid wall, and uses a quick release knot. Some horses learn how to untie a quick release knot. A quick release knot is also known as a combination knot.

When there are no suitable objects to which a horse can be tied, it may be possible to use a ground tie. Especially useful on trail rides when stopping in an open park or pasture, the first step of a ground tie is to dig a small hole about one foot deep. The lead rope is tied to an object such as a stone, branch or even a hammer. The object is placed in the hole and dirt is packed into the hole.

The third type of tying is called cross tying. However, cross tying requires special equipment and special training to avoid injury to the handler and the horse.

A common problem associated with traditional tying techniques include the ability of horses to untie the knots made with the lead rope. Another shortcoming of traditional tying techniques is tendency of horses injuring themselves when spooked or endangered and are unable to break free of the lead rope tie.

The present invention addresses these and other problems encountered with traditional methods of tying by providing a lead rope having a break-away hook latch at a first end of the rope, and a regular hook spaced approximately eighteen inches from the break-away hook latch. The invention allows the horse to be safely handled and easily tied to a variety of objects and the break-away hook latch allows the horse to free itself from the tie upon the application of a pre-determined amount of pressure. This break-away hook would withstand normal pressures associated with normal movement of the horse and would only break free when the horse applies a large amount of force such as when the horse is in danger.

SUMMARY OF THE INVENTION

Accordingly, an object of the present invention is to provide an improved lead rope.

A further object of the present invention is to provide a lead rope with multiple hooks that can easily be fixed to the headpiece of a horse and to an object.

A still further object if the present invention is to provide a method of tying a horse using a dual hook lead rope.

Other and further objects of the invention, together with the features of novelty pertinent thereto, will appear in the course of the following description.

BRIEF DESCRIPTION OF THE DRAWINGS

In the accompanying drawings which form a part of the specification and are to be read in conjunction therewith and in which like referenced numerals are used to indicate like parts in the various views:

FIG. 1 is a top view of the lead rope of the present invention;

FIG. 2 is a depiction of the lead rope of the present invention in use with a horse that is tied to a post;

FIG. 3 is an enlarged view of the area of FIG. 2 showing a separated break-away hook; and FIG. 4 is a depiction of the present invention and a horse after the break-away hook has been separated.

DETAILED DESCRIPTION OF THE INVENTION

Referring to FIG. 1 of the drawings, a woven rope 10 is adapted to receive a first hook 12 at an end of rope 10 and a second hook 14 spaced apart from first hook 12. Preferably, second hook 14 is spaced approximately eighteen (18) inches from first hook 12. Both first hook 12 and second hook 14 are secured to the rope by a pair of swivels 16, 16. Each swivel 16 is woven into the rope. This can be accomplished by unraveling the rope from the end that will have the first hook 12 until the point where second hook 14 is to be secured. Several strands of the rope are placed through swivel 16 and the rope is rewoven.

The terminal ends of the rope remain secure and do not unravel by a capping technique that is commonly referred to as crowning and tucking. Generally, the crown and tuck a rope, the strands of the rope are unwoven and a knot is tied and the strands are woven back into the rope.

Best shown in FIG. 3, first hook is a break-away type hook wherein a neck 18 projects from the body of the hook and it received into an aperture in swivel 16. A bell 20 prevents the hook from disengaging from the swivel under normal forces and horse movement. If the horse becomes spooked, or if sufficient pressure is otherwise applied to the rope, hook 12 will detach from swivel 16, leaving the hook attached to the object to which it is clipped (see FIG. 3).

Hook 14 is shown as a break-away hook but can be any standard type of clasp or hook.

Referring to FIG. 2 of the drawings, there shown a horse 22 wearing a halter 24 extending around the head and nose of horse 22. Halters such as halter 24 are typically fitted with a halter ring 26 and may be used in conjunction with a bridle 34 having reins 32 to control the movement and direction of the horse. In a typical tying situation, there is a post 28 having a ring 30 to which break-away hook 12 can be secured. Lead rope 10 is secured to the halter 24 by attaching hook 14 to the halter ring 26. First hook 12 is attached to ring 30 on post 28. Thus, the horse 22 is secured to post 28 via the lead rope. It should be understood that horse 22 may be tied to object other than post 28 and ring 30.

When the horse 22 is spooked or otherwise applies sufficient force upon the lead rope to cause the ball 20 of neck 18 of break-away hook 12 to disengage from swivel 16, hook 12 remains clasped to ring 30 as shown in FIG. 3.

After the break-away hook has been disengaged, the resulting disposition of the lead rope 10 is best shown in FIG. 4 of the drawings. It is clear that the lead rope 10 is still secured to the horse 22 via the interaction of hook 14 with halter ring 26. The portion of rope 10 intermediate hook 14 and hook 12 is free and dangles to the ground, thereby providing a second rope portion by which the handler can obtain control of the horse.

Additionally, use of the front hook 12 makes for a secure way to tie an animal without the concern of the animal becoming untied by accident or by animal wilds. If circumstances require the traditional way of tying an animal, the handler will still have the ability to tie the animal in the traditional manner. Also, the lead rope of the present invention is useful in teaching beginners the art of reining without causing confusion or pain to the animal with an assistant maintaining control of either the actual reins or with the lead. Moreover, the lead rope of the present invention can also be used as reins if the handler decides to ride the horse without a bridle.

From the foregoing, it will be seen that this invention is one well adapted to obtain all ends and objects here and above set forth, together with other advantages which are obvious and which are inherent to the structure.

It will be understood that certain features and subcombinations are of utility and may be employed without further reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed:

1. A dual hook lead rope for leading and tying an animal, said lead rope comprising:
    a rope having a first end and a second end;
    a first fastening device secured to said first end of said rope, said first fastening device adapted to disconnect from said rope when pressure is applied to said rope;
    a second fastening device secured to said lead rope at a point intermediate said first end and said second end of said rope.

2. A lead rope as in claim 1, wherein said rope is flexible.

3. A lead rope as in claim 2, wherein said rope is composed of natural fiber.

4. A lead rope as in claim 2, wherein said rope is composed of synthetic fiber.

5. A lead rope as in claim 1, wherein said first fastening device is a hook.

6. A lead rope as in claim 1, wherein said first fastening device is a clasp.

7. A lead rope as in claim 1, wherein said first fastening device is a break-away hook.

8. A lead rope as in claim 1, wherein said second fastening device is a hook.

9. A lead rope as in claim 1, wherein said s econd fastening device is a clasp.

10. A lead rope as in claim 1, wherein said second fastening device is a break-away hook.

11. A method of tying an animal with a lead rope having a first fastening device secured to a first end of said lead rope and a second fastening device secured to said lead rope at a point intermediate said first end and a second end, said method comprising:
    securing a headpiece to the head of said animal;
    fastening a lead rope to said headpiece via said second fastening device; and
    securing said first fastening device to a fixed location, wherein said first fastening device is adapted to release from said fixed location when pressure is applied to said rope.

12. The method of claim 11, wherein said headpiece is a bridle.

13. The method of claim 11, wherein said headpiece is a halter.

14. The method of claim 11, wherein said first fastening device is a break-away hook.

15. The method of claim 11, wherein said lead rope is made of natural fibers.

16. The method of claim 11, wherein said lead rope is made of synthetic fibers.

17. The method of claim 11, wherein the animal is a horse.

* * * * *